(No Model.)

2 Sheets—Sheet 1.

A. E. NIELSEN.
FARE REGISTER.

No. 600,127. Patented Mar. 1, 1898.

WITNESSES

INVENTOR
Andrew E. Nielsen
by G. H. Huntington
Attorney (No Model.) 2 Sheets—Sheet 2.

A. E. NIELSEN.
FARE REGISTER.

No. 600,127. Patented Mar. 1, 1898.

WITNESSES

INVENTOR
Andrew E. Nielsen
by G. H. Huntington
*Attorney*

UNITED STATES PATENT OFFICE.

ANDREW E. NIELSEN, OF BROOKLYN, NEW YORK, ASSIGNOR TO THE STERLING SUPPLY AND MANUFACTURING COMPANY, OF NEW YORK.

FARE-REGISTER.

SPECIFICATION forming part of Letters Patent No. 600,127, dated March 1, 1898.

Application filed December 8, 1897. Serial No. 661,195. (No model.)

*To all whom it may concern:*

Be it known that I, ANDREW E. NIELSEN, a citizen of the United States, residing in the city of Brooklyn, county of Kings, and State of New York, have invented a new and useful Improvement in Fare-Registers, of which the following is a specification.

My invention relates to fare-registers of the class in which a dial and pointer are employed to indicate the number of fares received, and it has reference particularly to that class of machines of this nature represented by the machine shown and described in the Patent No. 576,786, issued to John J. Kennelly February 9, 1897.

My invention constitutes an improvement on the machine shown and described in said patent to Kennelly, and I shall therefore briefly describe Kennelly's machine in order to more clearly set forth the function and operation of my improvement thereto.

Figure 1:
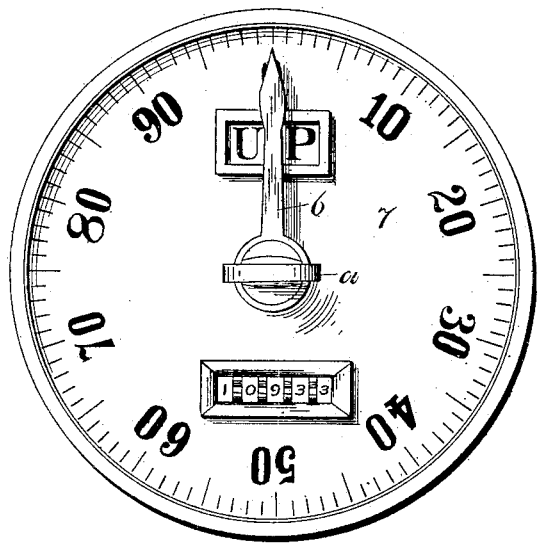
Figure 2:
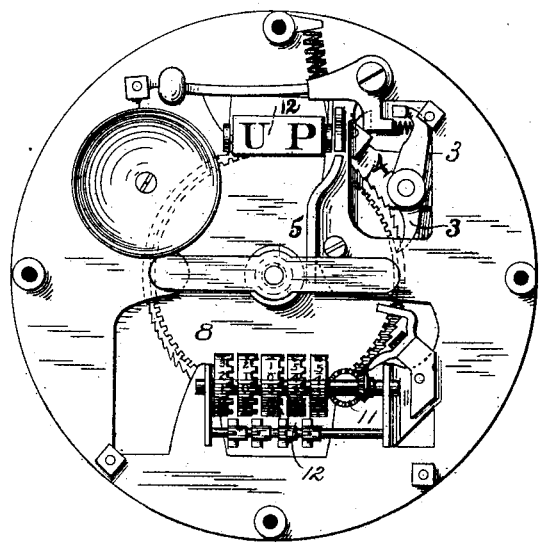
Figure 3:
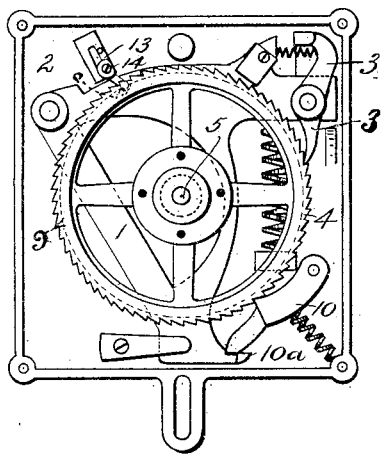
Figure 4:
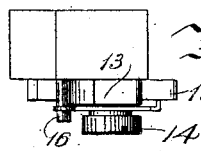
Figure 5:
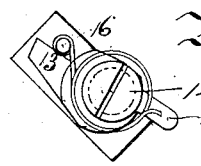
Figure 6:
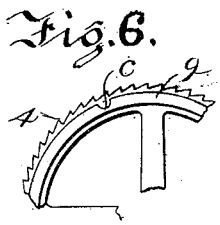

In the accompanying drawings, Figure 1 is a view in elevation of a fare-register of the character referred to. Fig. 2 is a similar view with the dial and pointer removed, showing some of the internal mechanism of the machine. Fig. 3 is also a view in elevation, and in this view parts of the machine which are hidden from view by those elements shown in Fig. 2 are seen. Fig. 4 is a side elevation, and Fig. 5 a plan view, of a certain spring-actuated pawl used in my improved machine; and Fig. 6 is a view in elevation of a portion of a certain ratchet-wheel also used in my improved machine.

In this machine a spring-actuated bell-crank lever 1 is fulcrumed in the casing 2 near one corner thereof. Said lever is connected at the end of one of its arms with any suitable operating element and carries on its other arm a spring-actuated pawl 3, which pawl engages the teeth of and thus rotates in a step-by-step movement a ratchet-wheel 4, rigidly mounted near the center of the casing on a shaft 5, journaled in the front and rear walls of the casing and movable in the direction of its length against the tension of a spring. A pointer 6, that indicates on a dial 7 the number of fares registered, is carried at the outer end of the shaft, and a thumb-piece $a$ for resetting said pointer is also fixed to the outer end of said shaft. The ratchet-wheel carries on its front face a gear-wheel 8, and on its rear face it has a flange 9, integrally formed thereon and provided on its periphery with a tooth that coincides with one of the teeth of the ratchet-wheel, as fully described in the patent to Kennelly above referred to. A spring-pressed pawl 10 engages the teeth of the ratchet-wheel and prevents its backward rotation. This pawl is so arranged with respect to and held from movement by a stop $10^a$ on the lever that it can only be moved outwardly to permit a tooth to pass when the lever is held against the action of its spring. By a suitable train of mechanism 11, consisting of pinions and gear-wheels, the gear-wheel 8 is in operative engagement with a permanent registering device 12, which presents at an aperture in the dial the sum-total of registered fares. By means of the thumb-piece $a$ the shaft and the pointer and gear and ratchet wheels which it carries may be returned to the zero position by first drawing the shaft outwardly until the pawl 10 disengages and snaps behind the ratchet-wheel, said pawl being displaced from this position (when the parts have been rotated forward far enough so that the pointer again registers with the zero-mark) by the tooth which, as before stated, is situated on the periphery of the flange 9. Of course the tooth is arranged on the periphery of the disk with reference to that tooth on the ratchet-wheel which always coincides with the pointer, so that the distance between them shall equal the distance between the zero-mark and the point of the pawl. By a suitable system of elements, which do not require particular description, the shaft 5 is connected with a rectangular block 12, having "Up" and "Down" or other equivalent words for indicating the direction in which the vehicle is to move after resetting the machine, shown alternately on four consecutive faces, so that when said shaft is drawn outwardly, turned backward, and returned to its normal position a different face of the block is shown. It is obvious from the foregoing that by inserting a bent wire or other delicate instrument into the casing and holding down the lever the pawl 10 may be held from beneath the ratchet-wheel, so that the pointer may be set at any index and at the same time be perfectly operative.

The combination of elements which I am now about to describe is for the purpose of preventing the above-mentioned surreptitious manipulation of the machine. Substantially opposite to the pawl 10 I place an auxiliary pawl 13, which is pivoted on a stem or stud 14 and is provided with an arm 15, that receives the end of a wire spring, the other end of said spring being so connected with a stud 16 that the pawl is normally pushed into engagement with the periphery of the flange 9. In the periphery of said flange 9 I cut a notch or recess $c$, which is situated with reference to that tooth of the ratchet-wheel which always coincides with the pointer and with reference to the distance between the point of the pawl and the zero-mark on the dial. When the wheels are rotated by the actuation of the lever, pawl 13 is disengaged from the notch $c$ and wipes on the periphery of the flange. In the operation of returning the wheels to reset the machine said pawl slips behind the flange and does not permit the return of the parts to their normal and operative position (even though the pawl 10 is held back) until said pawl 13 registers with the notch $c$, and this can only occur when the pointer is at the zero position.

Having thus fully described my invention, what I claim, and desire to secure by Letters Patent of the United States, is—

1. In a fare-register, the combination with a ratchet-wheel revoluble in either of two planes in a forward and a backward direction respectively, and with means for preventing said wheel from assuming one of said planes after having occupied the other of said planes except when said wheel has been rotated to a given position, of an auxiliary means for preventing said wheel from assuming one of said planes after having occupied the other of said planes, substantially as described.

2. In a fare-register, the combination with a ratchet-wheel revoluble in either of two planes in a forward and a backward direction respectively and with means for preventing said wheel from assuming one of said planes after having occupied the other of said planes except when said wheel has been rotated to a given position, of an auxiliary element for preventing said wheel from assuming one of said planes after having occupied the other of said planes, and means for disengaging said element when the wheel has been rotated to a given position, substantially as described.

3. In a fare-register, the combination with a ratchet-wheel revoluble in either of two planes in a forward and a backward direction respectively and with means for preventing said wheel from assuming one of said planes after having occupied the other of said planes except when said wheel has been rotated to a given position, of an auxiliary pawl for preventing said wheel from assuming one of said planes after having occupied the other of said planes, and means for disengaging said pawl when the wheel has been rotated to a given position, substantially as described.

4. In a fare-register, the combination with a ratchet-wheel revoluble in either of two planes in a forward and a backward direction respectively and with means for preventing said wheel from assuming one of said planes after having occupied the other of said planes except when said wheel has been rotated to a given position, of an auxiliary pawl for preventing said wheel from assuming one of said planes after having occupied the other of said planes, said wheel being provided with a recess adapted to receive the point of, and to disengage, said pawl when the wheel has been rotated to a given position, substantially as described.

5. In a fare-register, the combination with a ratchet-wheel revoluble in either of two planes in a forward and a backward direction respectively and carrying a flange on one of its faces having a recess in the periphery thereof, and with means for preventing said wheel from assuming one of said planes after having occupied the other of said planes except when said wheel has been rotated to a given position, of an auxiliary spring-actuated pawl for preventing said wheel from assuming one of said planes after having occupied the other of said planes, said pawl being adapted to enter the recess so as to be thereby disengaged, substantially as described.

In testimony that I claim the foregoing specification I have hereunto set my hand this 11th day of August, 1897.

ANDREW E. NIELSEN.

In presence of—
ALBERT LATHAM,
G. H. HUNTINGTON.